April 5, 1932. C. H. WHITE 1,851,993
LISTER
Filed April 24, 1930 4 Sheets-Sheet 1

Inventor.
Charles H. White
Witness
Milton Lenoir
By Brown, Jackson, Boettcher & Dienner
Attorneys

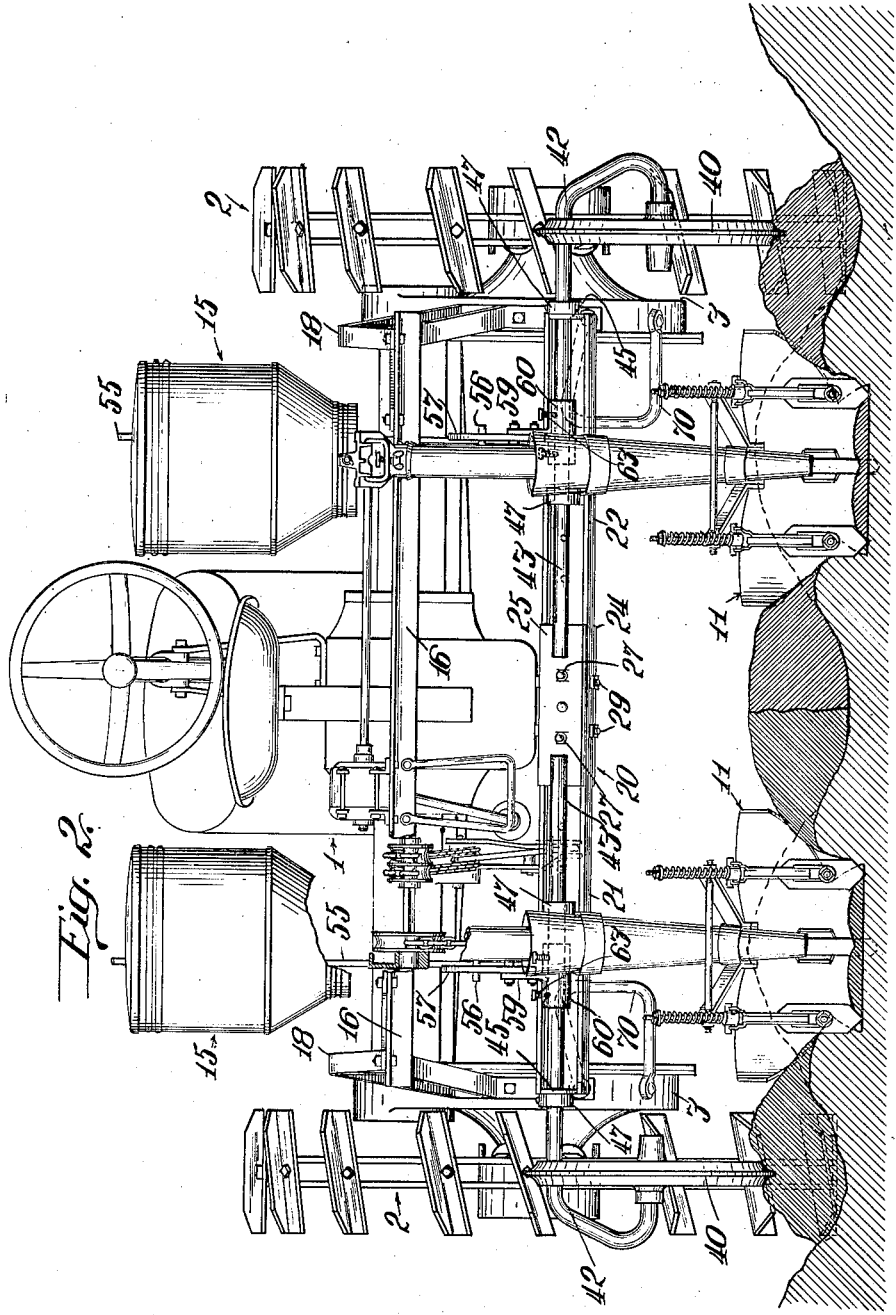

April 5, 1932.　　　　　C. H. WHITE　　　　　1,851,993
LISTER
Filed April 24, 1930　　　4 Sheets-Sheet 3
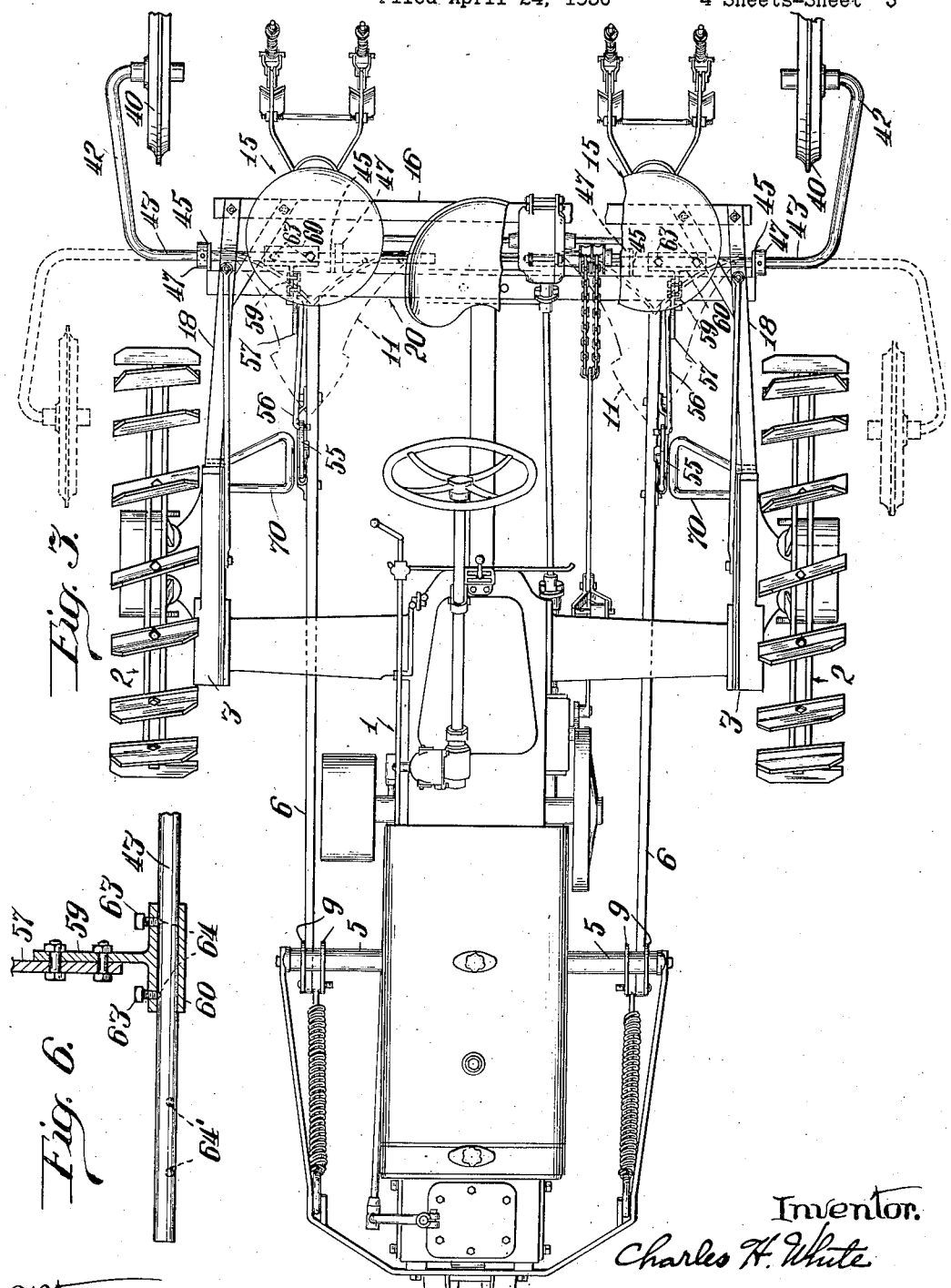

April 5, 1932. C. H. WHITE 1,851,993
LISTER
Filed April 24, 1930 4 Sheets-Sheet 4
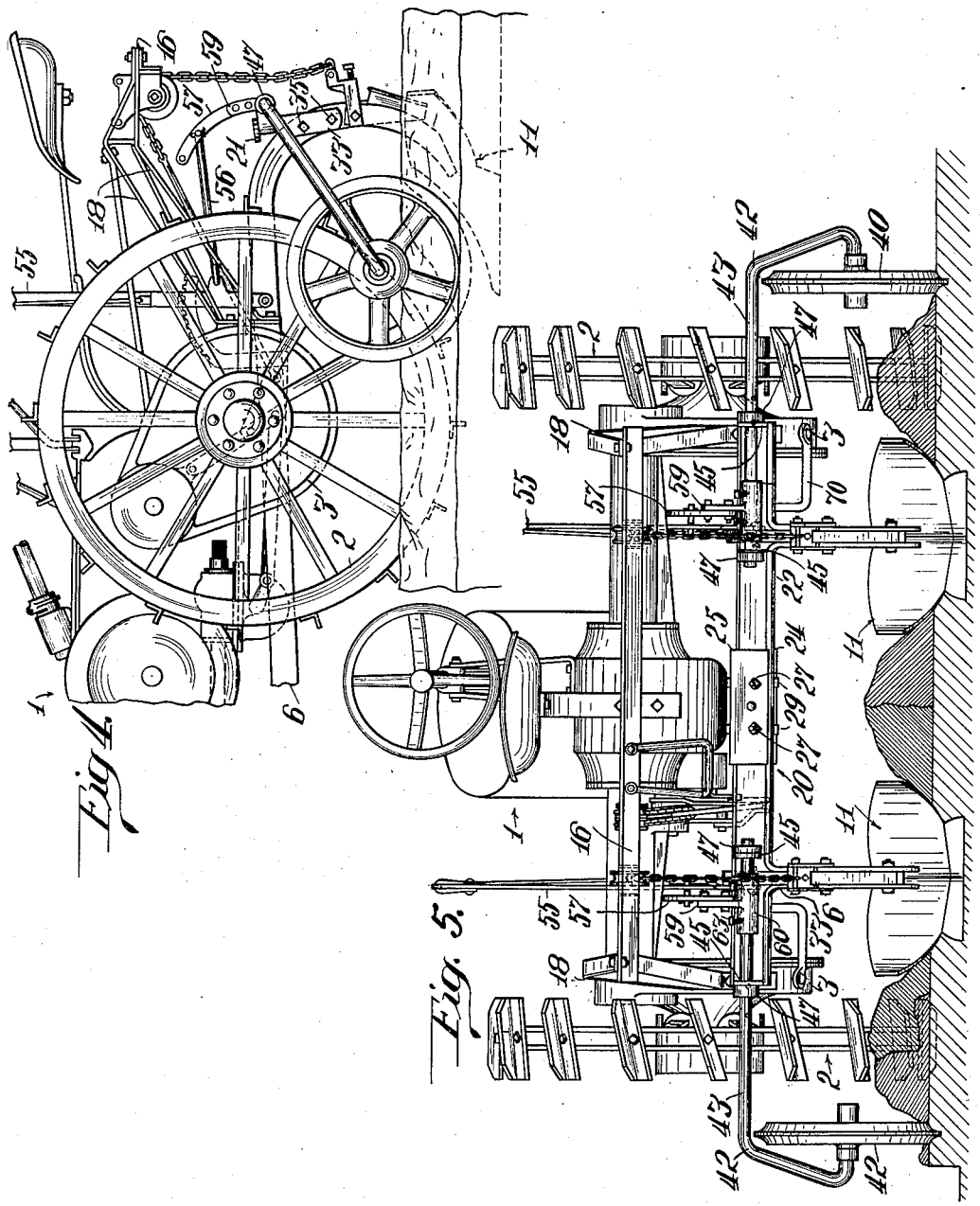
WITNESS
Walter Ackerman
INVENTOR
Charles H. White
BY Brown, Jackson, Boettcher & Dienner
ATTORNEYS Patented Apr. 5, 1932

1,851,993

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

LISTER

Application filed April 24, 1930. Serial No. 446,813.

The present invention relates generally to agricultural implements and more particularly to a type of implement adapted for attachment to or to be carried by a motor driven tractor so that when connected together the two function as a single power operated machine.

More specifically, my invention is concerned with the provision of an efficient machine adapted particularly for use in preparing the seed bed and in planting cotton, although it is to be understood that it is also applicable to corn or other listed crops as well.

The principal feature of my invention may be said to lie in the provision of an improved arrangement of adjustable gauge wheels for regulating the operating depth of the ground working elements, whereby the gauge wheels may be so positioned relative to the tractor and to the ground as to secure the best results for the particular operation performed by the implement at any one time.

In the cotton country for which these implements have been particularly designed, it is usual to plow out the old cotton stalks with a middle burster, thus forming ridges and furrows, shortly after the cotton has been harvested. Shortly before planting the middle burster is again used to split the old ridges and throw the earth into the old furrows, thus forming ridges where the furrows were and furrows where the ridges were. In different sections of the country it is considered necessary, because of climatic conditions, to plant at the same time the ridges are being formed the second time. It is in such sections of the country where the planting is done simultaneously with the second ridging operation that the implement of the present invention has been of greatest utility, although it is to be understood that my invention may be employed under other circumstances.

For example, while my machine is particularly adapted to be used with planting mechanism during the second ridging operation, it is obvious that, if desired, the planting mechanism may be omitted during both the first ridging operation and the second ridging operation.

When making the ridges the first time, it is most desirable that the gauging of the depth for the furrow openers be done from the undisturbed ground surface for two reasons. The first is the obvious reason that it is possible to plow at a uniform depth with respect to the ground surface only by gauging from the ground surface itself. The second reason is that it is desirable not to have to shift the depth adjusting levers each time the implement is turned around at the end of the field to start the next rows. Since the gauge wheel that is the landward wheel in traveling up the field, must necessarily run on the undisturbed land, becomes the furrow wheel when coming back, both wheels must gauge from the same level in order that it not be necessary to shift the position of the wheels at the end of the field. It is, of course, also necessary, for accurate gauging, that the gauge wheels be positioned as close as possible to the ground working tool.

For the first ridging operation I preferably space the gauge wheels so that they substantially clear the ridges thrown up by the furrow openers, the spacing being such, however, that the furrowed gauge wheel does not run into the adjacent furrow. In this manner the gauge wheels gauge the depth of operation of the furrow openers substantially from the undisturbed ground.

For the second ridging and planting operation it is desirable to change the spacing of the gauge wheels in order that the latter may not cause any of the soil to roll down into the furrow and on top of the covered seed, it being understood that in order to secure a good stand it is very important that the seed be covered with just the right amount of soil.

By thus providing an improved depth gauging means operable in the first operation of ridging and in the second operation of ridging and planting, I provide in a single machine an implement equally efficient in performing two different operations, thus reducing the cost of producing a crop.

Other objects and advantages of my invention will be apparent to those skilled in the art after a consideration of the following detailed description of one embodiment of the same, taken in conjunction with the accompanying drawings, in which:

Figure 2 is an enlarged rear view showing the parts as arranged in Figure 1 and as employed in the second ridging operation, referred to above;

Figure 3 is a top plan view of the machine as arranged in Figure 1, showing also, in dotted lines, the position of the depth gauging means adjusted for the first ridging operation;

Figure 4 is a fragmentary side elevation showing the depth gauging means arranged for the first ridging operation;

Figure 5 is a rear view of the machine as arranged in Figure 4;

Figure 6 is a detail of the lifting connection to the axle of the gauge wheels.

Figure 1:
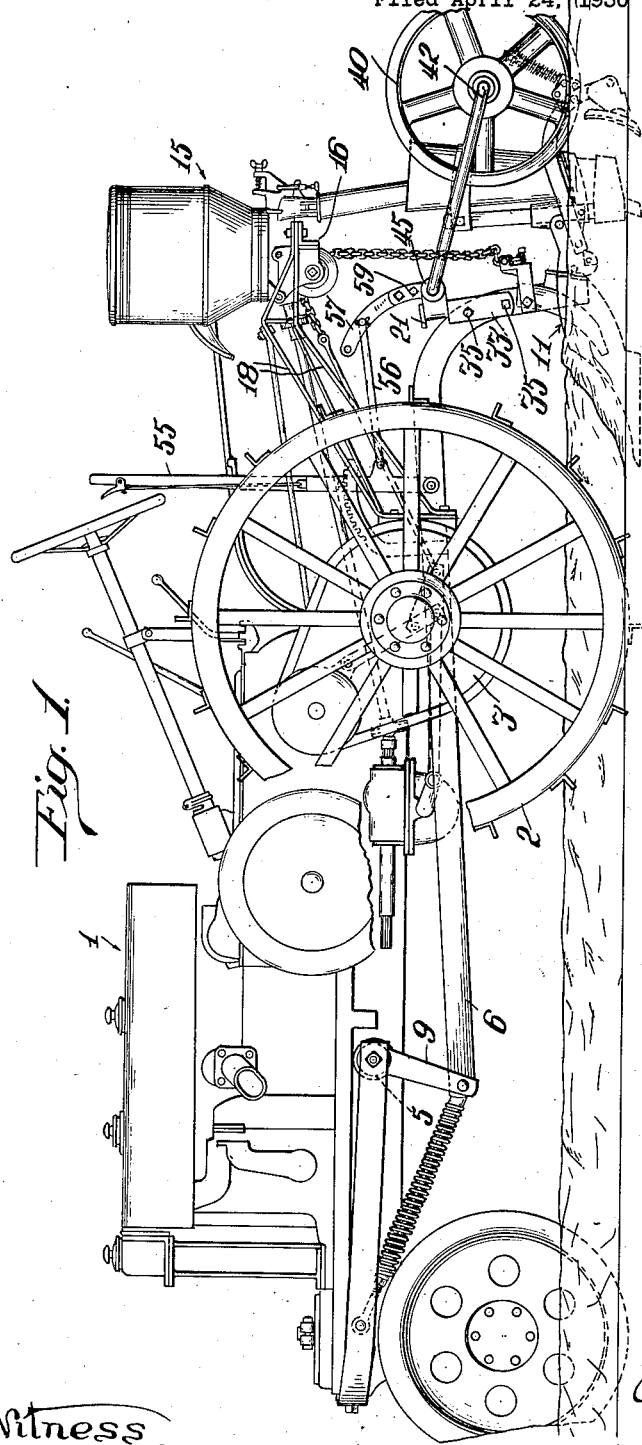
Figure 1 is a vertical elevation showing the planting mechanism, the depth gauging means and the furrow opening means in operative relation.

In the particular embodiment illustrated, the reference numeral 1 indicates generally the tractor having the customary drive wheels 2 and drive housings 3. Pivotally connected to the front of the tractor, as by a bar or shaft 5, are a plurality of longitudinally extending beams 6. The beams 6 are connected to the shaft 5 by means of links or arms 9 and at their rear ends the beams 6 curve downwardly for connection with the furrow openers 11.

The usual planting mechanism is indicated by the reference numeral 15 and it is supported upon transversely extending bars 16 carried by brackets 18 which may be bolted to the drive housings 3.

Figure 8:
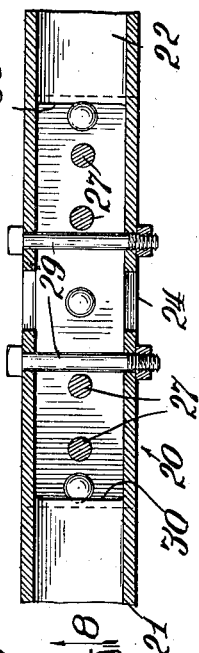
Figures 7 and 8 are enlarged detail views of the beam connecting means which serve to rigidly connect the beams of the furrow openers.
Figure 7:
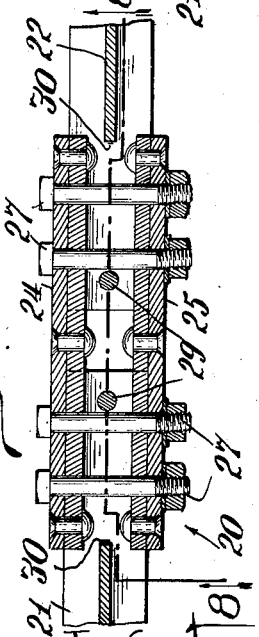

The longitudinally extending beams 6 are rigidly connected together at their rear ends by means of a transverse connecting member indicated in its entirety by the reference numeral 20. The member 20 comprises two I-beams 21 and 22 bolted together at their inner ends by two plate members 24 and 25, see Figures 7 and 8, and each of the plate members is made up of two plates as indicated in Figure 7. The outer plate of each of the plate members 24 and 25 is adapted to fit against the outer edges of the flanges of the I-beams while the inner plates of the plate members 24 and 25 are adapted to abut against the inner surfaces of the flanges of the I-beams 21 and 22. The plate members 24 and 25 are each provided with four holes through which bolts 27 are adapted to be passed whereby the plate members 24 and 25 may be clamped or drawn up against the edges of the flanges of the I-beams 21 and 22. The adjacent ends of these flanges are apertured and through the apertures bolts 29 are passed, see Figure 8, whereby the flanges of the I-beams 21 and 22 can be drawn against the inner plates of the plate members 24 and 25, the webs of the I-beams 21 and 22 being interrupted, as indicated by the reference numeral 30, for this purpose.

The outer ends of the I-beams 21 and 22 are each provided with a depending bracket 33 secured thereto, as by welding or the like. The brackets 33 are each bolted to the corresponding beam 6 by bolts 35 as indicated in Figures 1 and 4.

The depth gauging mechanism is seen to comprise a pair of gauge wheels 40 mounted upon the inwardly turned horizontal portions of the crank axles. Each of the crank axles 42 have transversely extending portions 43 by which the crank axles 42 are journaled upon the transverse connecting member 20. Adjacent the outer ends of the transverse member 20 are a number of bearing brackets 45 secured thereto, as by welding, and these brackets rotatably receive the crank axles 42 whereby the rear ends of the beams 6 may be supported. Collars 47 are provided for the purpose of preventing undesired transverse displacement of the crank axles 42 in the bearing brackets 45, and these collars 47 may be secured to the crank axles 42 by set screws projecting or threaded into holes formed in the crank axles 42. I preferably supply a number of holes therefor, such as are indicated in Figure 5 by the reference numeral 50, for a purpose later to be described.

The manual means I have provided for adjusting the depth of operation of the furrow openers 11 is seen to consist of a hand lever 55 mounted on each of the beams 6 and including the usual ratchet and pawl mechanism for retaining the levers 55 in any of their adjusted positions. A link 56 is connected to the lever 55 at its forward end, and at its rearward end the levers 56 are each connected to arms 57 bolted to an upwardly projecting lug 59 formed on or a part of a sleeve member 60. As is more clearly disclosed in Figure 6, the sleeve member 60 extends laterally in both directions from the lug 59 and is adapted to embrace the crank axle 42. The sleeve member has a pair of cap screws 63 threaded into it and adapted to extend into similarly spaced depressions 64 formed in the crank axle 42. Spaced from the pair of depressions 64 is another pair of depressions 64' which are also spaced a distance apart so as to be engaged by the cap screws 63. It will be noted that in Figure 6 the depressions 64' are spaced both laterally and angularly from the depressions 64. This is for the purpose of allowing the crank axles 42 to be secured to the sleeve members 60 in either of two positions.

One position of the crank axles 42 and the gauge wheels 40 is shown in full lines in Figu. 3. In this position it will be noted that the crank axles 42 are so adjusted as to bring the wheels 40 rearwardly of the furrow openers 11 and in their closest position, that is, practically directly behind the drive wheels 2 so that they run on the ridges thrown up by the furrow openers 11, as indicated in Figure 2. This is the position, it will be noted, for which the gauge wheels are adjusted when performing the second ridging operation.

When performing the first ridging operation the crank axles 42 and the gauging wheels 40 are positioned as shown in dotted lines in Figure 3, that is, each of the crank axles are moved outwardly to space the gauge wheels 40 farther apart, the cap screws 63 being loosened to allow the crank axles to be moved relative to the sleeves 60 and the collars 47 being loosened to allow the crank axles to be moved outwardly relative to the bearing brackets 45 carried on the transverse connecting member 20. At the same time the crank axles 42 are cranked from a rearwardly extending position as shown in Figure 1 to a forwardly extending position as shown in in Figure 4, thus bringing the gauge wheels 40 from a position behind the drive wheels to a position laterally adjacent them.

During the first ridging operation it is preferable to detach the planting mechanism 15 and then subsequently attach the same for operation during the second ridging operation so that the planting is done at the latter time.

In order to prevent the ground working tools from swaying laterally with respect to the tractor I provide a pair of bumpers 70 for attachment to the tractor at any convenient point. These bumpers 70 comprise a U-shaped bar the ends of which are bolted to the drive housings 3. The intermediate portions of the U-shaped bumpers 70 extend in a vertical plane as indicated in Figure 2 and in a position to bear against the outer sides of the beams 6 to prevent them from swerving laterally.

When performing the first ridging operation the gauge wheels are positioned as shown in Figure 5, and in this operation the rows or furrows are made consecutively across the field, that is, the implement is driven back and forth across the field, and when going in one direction the left hand gauge wheel 40 will run close to the adjacent furrow, see Figure 5, and in going in the other direction the right hand wheel will be the one running close to the adjacent furrow. During the second ridging and planting operation the operator plants two rows and then skips two rows, taking the next two, and so on. That is, the operator plants rows 1 and 2, 5 and 6, 9 and 10, and so on, and after he has covered the field in this manner, taking alternate pairs of rows, he starts back and opens up and plants in the rows he left, that is, rows 3 and 4, 7 and 8, and so on. When planting rows 1 and 2, etc., the drive wheels of the tractor run in the bottoms of the old furrows, as indicated in Figure 2, but in planting rows 3 and 4, etc., the drive wheels of the tractor are positioned to run on the adjacent half ridges previously formed.

When performing the second ridging and planting operation it is preferable to dispose the gauge wheels in the positions shown in Figures 2 and 3, rather than in the positions shown in Figures 4 and 5. In this second listing and planting operation if the gauge wheels are left in the position shown in Figure 5, corresponding to their position for the first listing operation, it is found that most frequently the gauge wheels run along a line half-way down the slope of a ridge, cutting through onto the surface of the undisturbed soil, and tending to scrape soil from the side of the ridge down into the furrow on top of the covered seed. It is quite important that the seed be covered with just a right amount of soil and hence it is preferable in this second listing and planting operation to dispose the gauge wheels in the position shown in Figure 2 where they will not cause soil to roll down upon the covered seed. In this position, with each gauge wheel disposed substantially directly back of the rear tractor wheel, the gauge wheel will run on the top of the newly formed ridge, which is more or less flat, and where it is farthest removed from the seed rows in the furrows on either side thereof. As previously remarked, when the gauge wheels are positioned as shown in Figure 5, in the first listing operation, the gauge wheel at one side of the implement will run close to the adjacent furrow when traveling in one direction, and when traveling in the other direction the gauge wheel on the opposite side of the implement will be the one running close to the adjacent furrow, the rows or furrows at this time being made consecutively across the field. This relation of each gauge wheel relative to the furrow, when the wheel is traveling adjacent to the furrow, is obtained by spacing each gauge wheel laterally from the adjacent tool or furrow opener a distance equal to the furrow spacing minus a little more than half the width of the furrow.

It will be apparent that the lateral spacing between the plow beams, 6, 6 may be adjusted by loosening the bolts 27 and removing the bolts 29 (Figures 7 and 8) and sliding the beams 21 and 22 toward or from each other, whereupon these beams can be rigidly secured together in their adjusted relation by replacing and retightening the bolts.

I am well aware of the fact that my invention may be employed in a different manner than that illustrated. For example, the transverse connecting member 20 together with the crank axles 42 and gauge wheels 40 might be separately employed for attachment to other implements, for example, the implement shown and described in the copending application filed by Elmer McCormick and myself May 13, 1929, Serial No. 362,486, with the outside beams and planting mechanism of that machine removed, together with the gauge wheels associated therewith, and substituting therefor the beam structure 20 and gauge wheels 40 as shown in this application. Any suitable planting mechanism 15 may be employed, but as illustrative of one embodiment which may be used attention is directed to the planting mechanism disclosed in the above mentioned application, which also discloses the details of the yieldable hitch connection utilizing the springs connecting with the lower ends of the draft links or arms 9.

Another manner in which my invention may be used is as follows. Where it is desired to plant on the tops of the ridges, sweeps of the usual type are substituted for the furrow openers 11 which throw up a considerable ridge as indicated at the extreme right and left hand sides of Figure 2, and the gauge wheels 40 are set to run in the bottom of the old furrows, the spacing of the wheels 40 being the same as shown in Figure 2 since the sweeps merely cut off the top portion of the ridge and there is not enough soil displaced to fill up the old furrow as is the case when furrow openers 11 are used as shown in Figure 2.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:—

1. In an implement of the class described, in combination, a tractor, a plurality of draft transmitting beams, means pivoting the beams to the tractor, ground working tools carried by the beams, gauge wheels carried by the beams and adjustable in a plurality of fore and aft positions, and adapted to gauge the operating depth of said tools.

2. In an implement of the class described, in combination, a tractor, a plurality of draft transmitting beams, means pivoting the beams to the tractor, ground working tools carried by the beams, gauge wheels carried by the beams and adjustable in a plurality of lateral positions, and adapted to gauge the operating depth of said tools.

3. In an implement of the class described in combination, a tractor, a plurality of draft transmitting beams, means pivoting the beams to the tractor, ground working tools carried by the beams, gauge wheels carried by the beams and adjustable in a plurality of fore and aft and lateral positions, and adapted to gauge the operating depth of said tools.

4. In an implement of the class described in combination, a tractor having rear wheels, a plurality of beams extending substantially longitudinally of the tractor, means pivoting the beams to and under the tractor in front of the rear wheels thereof, ground working tools carried by the beams, gauge wheels carried by the beams and adjustable in a plurality of vertical and fore and aft positions, and adapted to gauge the operating depth of said tools.

5. In an implement of the class described in combination, a tractor, a plurality of beams, means pivoting the beams to the tractor, ground working tools carried by the beams, gauge wheels carried by the beams and adjustable in a plurality of vertical and lateral positions, and adapted to gauge the operating depth of said tools.

6. In an implement of the class described, in combination, a tractor, a plurality of beams extending substantially longitudinally of the tractor, means pivoting the beams to the tractor, ground working tools carried by the beams, gauge wheels carried by the beams and optionally movable to two separated fore and aft positions and adapted to gauge the operating depth of said tools.

7. In an implement of the class described, in combination, a tractor, a plurality of beams extending substantially longitudinally of the tractor, means pivoting the beams to the tractor, ground working tools carried by the beams, gauge wheels carried by the beams and optionally movable to two lateral positions and adapted to gauge the operating depth of said tools.

8. In an implement of the class described, in combination, a tractor, a plurality of beams extending substantially longitudinally of the tractor, means pivoting the beams to the tractor, ground working tools carried by the beams, gauge wheels carried by the beams and adjustable in a plurality of vertical positions and optionally movable to two lateral positions, and adapted to gauge the operating depth of said tools.

9. In an implement of the class described, in combination, a tractor having a rear axle, a plurality of beams in a general fore and aft direction relative to the tractor, means pivoting the beams to the tractor in front of said rear axle, ground working tools carried by the beams, gauge wheels carried by the beams and adjustable in a plurality of vertical positions and optionally movable to two fore and aft positions, and adapted to gauge the operating depth of said tools.

10. The combination with a tractor including front and rear wheels, of an implement comprising a plurality of beams extending substantially longitudinally of the tractor, means pivoting the beams to the tractor, ground working tools carried by the beams, gauge wheels carried by the beams and adjustable in a plurality of fore and aft positions, one position being directly behind the rear wheels and another being at one side of said rear wheels, said gauge wheels being adapted to control the operating depth of said tools.

11. The combination with a tractor including front and rear wheels, of an implement comprising a plurality of beams extending substantially longitudinally of the tractor, means pivoting the beams to the tractor, ground working tools carried by the beams, gauge wheels carried by the beams and adjustable in a plurality of lateral positions, one position being directly behind the rear wheels and another being at one side of said rear wheels, said gauge wheels being adapted to control the operating depth of said tools.

12. The combination with a tractor including front and rear wheels, of an implement comprising a plurality of draft transmitting beams, means pivoting the beams to the tractor, ground working tools carried by the beams, gauge wheels carried by the beams and adapted to be spaced laterally from the tools a distance equal to the spacing between the tools less a distance equal to slightly more than half the width of the furrow opened by said tools.

13. The combination with a tractor including front and rear wheels, of an implement comprising a plurality of beams extending substantially longitudinally of the tractor, means pivoting the beams to the tractor, furrow opening tools carried by the beams, gauge wheels carried by the beams and adapted to be spaced laterally therefrom such a distance as to run on the ridges formed by said tools.

14. The combination with a tractor including front and rear wheels, of an implement comprising a plurality of beams extending substantially longitudinally of the tractor, means pivoting the beams to the tractor, furrow opening tools carried by the beams, gauge wheels carried by the beams and adapted to be spaced laterally from the tools such a distance that they clear the ridges formed by said tools.

15. An implement of the class described comprising, in combination, a tractor having front and rear wheels, a plurality of beams extending longitudinally of the tractor between and forwardly of the rear wheels thereof, means pivotally connecting the forward portions of the beams to the tractor, ground working tools carried by the beams at their rearward portions, means connecting the rear portions of the beams together, crank axles journaled on said means and gauge wheels on said axles.

16. An implement of the class described comprising, in combination, a tractor having front and rear wheels, a plurality of beams extending longitudinally of the tractor and between the rear wheels thereof, means pivotally connecting the forward portions of the beams to the tractor, ground working tools carried by the beams at their rearward portions, means connecting the rear portions of the beams together, a pair of laterally extending crank axles, gauge wheels on the cranks of the axles, and adjustable journaling means supporting the said beams and connecting means on the axles.

17. An implement of the class described, comprising, in combination, a tractor having front and rear wheels, a plurality of beams extending longitudinally of the tractor and between the rear wheels thereof, means pivotally connecting the forward portions of the beams to the tractor, ground working tools carried by the beams at their rearward portions, means connecting the rear portions of the beams together, a pair of laterally extending crank axles, gauge wheels on the cranks of the axles, and adjustable journaling means operable to swing the axles on the beam connecting means at a number of selected lateral positions.

18. An implement of the class described comprising, in combination, a tractor having front and rear wheels, a plurality of beams extending longitudinally of the tractor and between the rear wheels thereof, means pivotally connecting the forward portions of the beams to the tractor, ground working tools carried by the beams at their rearward portions, means connecting the rear portions of the beams together, a pair of laterally extending crank axles, gauge wheels on the cranks of the axles, and adjustable journaling means operable to swing the axles on the beam connecting means at a number of selected lateral positions, one where the cranks of said axles extend rearwardly from the journaling means and another where the cranks extend forwardly.

19. An implement of the class described comprising, in combination, a tractor having front and rear wheels, a plurality of beams extending longitudinally of the tractor and between the rear wheels thereof, means pivotally connecting the forward portions of the beams to the tractor, ground working tools carried by the beams at their rearward portions, means connecting the rear portions of the beams together, a pair of laterally extending cranks axles, gauge wheels on the cranks of the axles, means to rock said axles to raise and lower the beams relative to said wheels, said means comprising a sleeve embracing each of the axles, cooperating means on the sleeves and the axles whereby the axles may be secured to the sleeves in a plurality of selected positions and means to turn the sleeves, and means journaling the axles on said beam connecting means.

20. An implement of the class described comprising, in combination, a tractor having front and rear wheels, a plurality of beams extending longitudinally of the tractor and between the rear wheels thereof, means pivotally connecting the forward portions of the beams to the tractor, ground working tools carried by the beams at their rearward portions, means connecting the rear portions of the beams together, a pair of laterally extending crank axles, gauge wheels on the cranks of the axles, means to rock said axles to raise and lower the beams relative to said wheels, said means comprising a sleeve embracing each of the axles, cooperating means on the sleeves and the axles comprising set screw means on one part, and a number of sets of apertures on the other part to receive the set screw means whereby the axles may be secured to the sleeves in a plurality of selected positions and means to turn the sleeves, means to prevent lateral displacement of the axles when in their selected positions, and means journaling the axles on said beam connecting means.

21. An implement of the class described comprising, in combination, a tractor having front and rear wheels, a plurality of beams extending longitudinally of the tractor and between the rear wheels thereof, means pivotally connecting the forward portions of the beams to the tractor, ground working tools carried by the beams at their rearward portions, means connecting the rear portions of the beams together, a pair of laterally extending crank axles, gauge wheels on the cranks of the axles, means to rock said axles to raise and lower the beams relative to said wheels, said means comprising a sleeve embracing each of the axles, cooperating means on the sleeves and the axles comprising set screw means on one part and a number of sets of apertures on the other part to receive the set screw means whereby the axles may be secured to the sleeves in a plurality of selected positions and means to turn the sleeves, and means journaling the axles on said beam connecting means, said journaling means comprising apertured brackets secured to the beam connecting means, the axles being supported in the apertures of the brackets.

22. An implement of the class described comprising, in combination, a tractor having front and rear wheels, a plurality of beams extending longtudinally of the tractor and between the rear wheels thereof, means pivotally connecting the forward portions of the beams to the tractor, ground working tools carried by the beams at their rearward portions, means connecting the rear portions of the beams together, a pair of laterally extending crank axles, gauge wheels on the cranks of the axles, means to rock said axles to raise and lower the beams relative to said wheels, said means comprising a sleeve embracing each of the axles, cooperating means on the sleeves and the axles comprising set screw means on one part and a number of sets of apertures on the other part to receive the set screw means whereby the axles may be secured to the sleeves in a plurality of selected positions and means to turn the sleeves, and means journaling the axles on said beam connecting means, said journaling means comprising apertured brackets secured to the beam connecting means, the axles being supported in the apertures of the brackets and collars mounted on the axles and adapted to bear against the brackets to maintain the axles in selected lateral position.

23. An agricultural machine of the class described comprising, in combination, a tractor, a plurality of draft transmitting beams means pivotally connecting the front end of the beams with the tractor, means connecting the rear ends of the beams together, earth working tools carried on the beam, and bumpers carried on the tractor in a position to be contracted by the beams to limit lateral movement thereof.

24. An agricultural machine of the class described comprising, in combination, a tractor, a plurality of beams extending longitudinally of the tractor, means pivotally connecting the front ends of the beams with the tractor, means connecting the rear ends of the beams together, earth working tools carried on the beam, and bumpers secured to the drive housings of the tractor and in a position to be contacted by the beams to limit lateral movement thereof.

25. An agricultural machine of the class described comprising, in combination, a tractor, a plurality of beams extending in a generally fore and aft direction relative to the tractor, means pivotally connecting the front ends of the beams with the tractor, means connecting the rear ends of the beams together, earth working tools carried on the beam, and bumpers comprising U-shaped brackets having the ends thereof secured to the drive housings of the tractor and their intermediate portions extending in a vertical plane longitudinally of the tractor and in a position to be contracted by the beams to limit lateral movement thereof.

26. In an implement of the class described, the combination with a tractor having longitudinally extending beams connected therewith, of a transversely extending member adapted to be secured to the beams and provided with crank axles, gauge wheels on the cranks, and means to connect the axles to the member in a number of selected positions whereby the spacing between the gauge wheels is adjusted.

27. In an implement of the class described, the combination with a tractor having a plurality of draft transmitting beams connected therewith, of a transversely extending member adapted to be rigidly secured to the beams and provided with crank axles, gauge wheels on the cranks, and means to connect the axles to the member in a number of selected positions where the gauge wheels may be adjusted at will to run on different portions of the ground relative to that traversed by the tractor.

28. In an implement of the class described, the combination with a tractor having longitudinally extending beams connected therewith provided with furrow opening tools, of a transverse connecting member and adapted to be secured to the beams and provided with crank axles, gauge wheels on the cranks, and means to connect the axles to the member in a number of selected positions whereby the axles can be adjusted at will so that the gauge wheels will run on the land or on the ridges formed by the tools.

29. A device of the class described comprising beam connecting means including a two part member, means for adjustably securing said parts together, attaching brackets at the ends of said member, crank axles journaled to said member, each of said axles including a crank and parallel extending axles, one journaled to said member, gauge wheels on the other, means including collars for maintaining the crank axles in a plurality of selected positions whereby the spacing between the gauge wheels may be adjusted to suit operating conditions, and means including a sleeve having a lug whereby each of the crank axles may be rocked.

30. A device of the class described comprising a beam connecting member including a pair of I-beams and means cooperating with the flanges of said I-beams to maintain them in adjusted end to end relation, beam attaching means carried by the member, crank axles having gauge wheels, and means rotatably connecting the axles and said member and comprising means adapted to be secured to the axles at a number of selected positions thereon.

31. A device of the class described comprising a beam connecting member including a pair of I-beams and means cooperating with the flanges of said I-beams to maintain them in adjusted end to end relation, beam attaching means carried by the member, crank axles having gauge wheels, and means rotatably connecting the axles and said member whereby the gauge wheels are movable in selected transversely spaced planes.

32. A device of the class described comprising a beam connecting member including a pair of I-beams and means cooperating with the flanges of said I-beams to maintain them in adjusted end to end relation, beam attaching means carried by the member, crank axles having gauge wheels, and means rotatably connecting the axles and said member, said means being so arranged that said axles and members are connected for relative movement in a number of spaced relative positions.

33. A device of the class described comprising a beam connecting member including a pair of I-beams and means cooperating with the edges and underside of the flanges of said I-beams to maintain them in adjusted end to end relation, beam attaching means carried by the member, crank axles having gauge wheels, and means rotatably connecting the axles and said member, said means being so arranged that said axles and members are connected for relative movement in a number of spaced relative positions.

34. A device of the class described comprising a beam connecting member including a pair of structural sections, each having a flange, a pair of plates having means to engage the edges and one surface of the flange on each section, means to draw the flanges against the plates, and means to draw the plates against the flanges whereby the said sections are maintained in adjusted relation, beam attaching means carried by the member, crank axles having gauge wheels, and means rotatably connecting the axles and said member, said means being so arranged that said axles and members are connected for relative movement in a number of spaced relative positions.

In witness whereof, I hereunto subscribe my name this 17 day of April, 1930.

CHARLES H. WHITE.

CERTIFICATE OF CORRECTION.

Patent No. 1,851,993.　　　　　　　　　　　　　Granted April 5, 1932, to

CHARLES H. WHITE.

It is hereby certified that error appears in the printed specification of the above numbered patent requiring correction as follows: Page 4, line 121, claim 9, for the word "general" read generally; page 6, line 87, claim 23, after the word "beams" insert a comma, line 88, for "end" read ends, and line 93, for "contracted" read contacted"; same page, line 119, claim 25, for "contracted" read contacted; and that the said Letters Patent should be read with these corrections therein that the same may conform to the record of the case in the Patent Office.

Signed and sealed this 14th day of June, A. D. 1932.

(Seal)　　　　　　　　　　　　　　　　　　　M. J. Moore,
　　　　　　　　　　　　　　　　　　　Acting Commissioner of Patents.